United States Patent [19]
Koths

[11] Patent Number: 6,104,910
[45] Date of Patent: Aug. 15, 2000

[54] STABILIZED MOBILE RELAY STATION

[76] Inventor: Kerry R. Koths, 10 New Boston Ct., Danville, Calif. 94526

[21] Appl. No.: 08/871,701

[22] Filed: Jun. 9, 1997

[51] Int. Cl.$^7$ ..................................................... H04B 7/15
[52] U.S. Cl. ........................................... 455/11.1; 343/878
[58] Field of Search ................................. 455/7, 11.1, 422, 455/562, 575, 129; 343/878, 882, 883

[56]  References Cited

U.S. PATENT DOCUMENTS

| | | | |
|---|---|---|---|
| 4,138,682 | 2/1979 | Doherty | 343/742 |
| 4,231,200 | 11/1980 | Henderson | 52/111 |
| 4,378,933 | 4/1983 | Holston | 254/399 |
| 4,866,893 | 9/1989 | McGinnis | 52/108 |
| 5,537,125 | 7/1996 | Harrell, Jr. et al. | 343/878 |
| 5,628,050 | 5/1997 | McGraw et al. | 455/67.7 |
| 5,787,111 | 7/1998 | Gilmore | 455/11.1 |

*Primary Examiner*—Edward F. Urban
*Attorney, Agent, or Firm*—Glen R. Grunewald

[57]  ABSTRACT

A mobile relay station including a mobile base having mounted thereon a mast for holding antenna, the mast being guyed over spreaders and connected to the sides of the base without permanent connection to the ground.

4 Claims, 4 Drawing Sheets

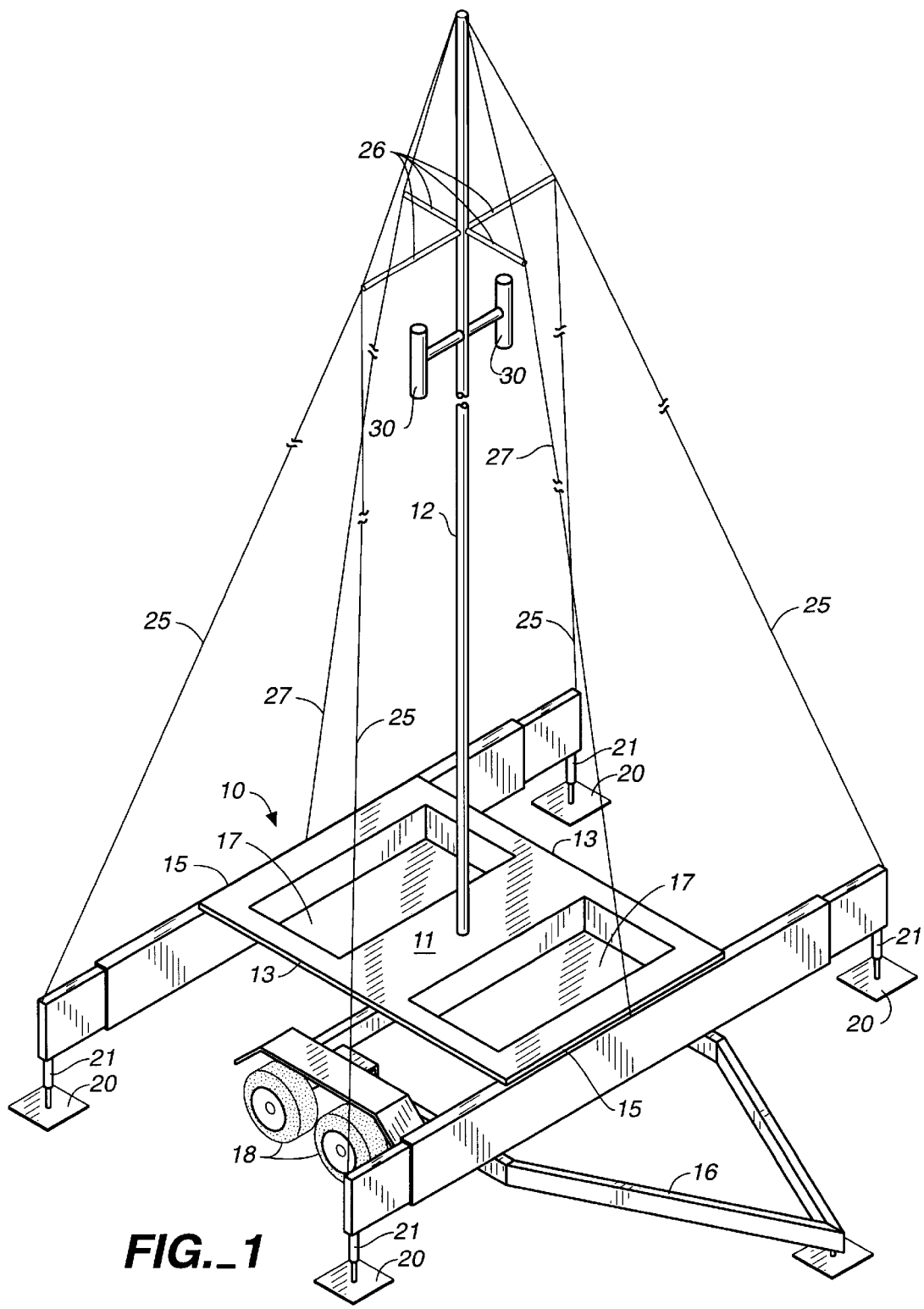
FIG._1

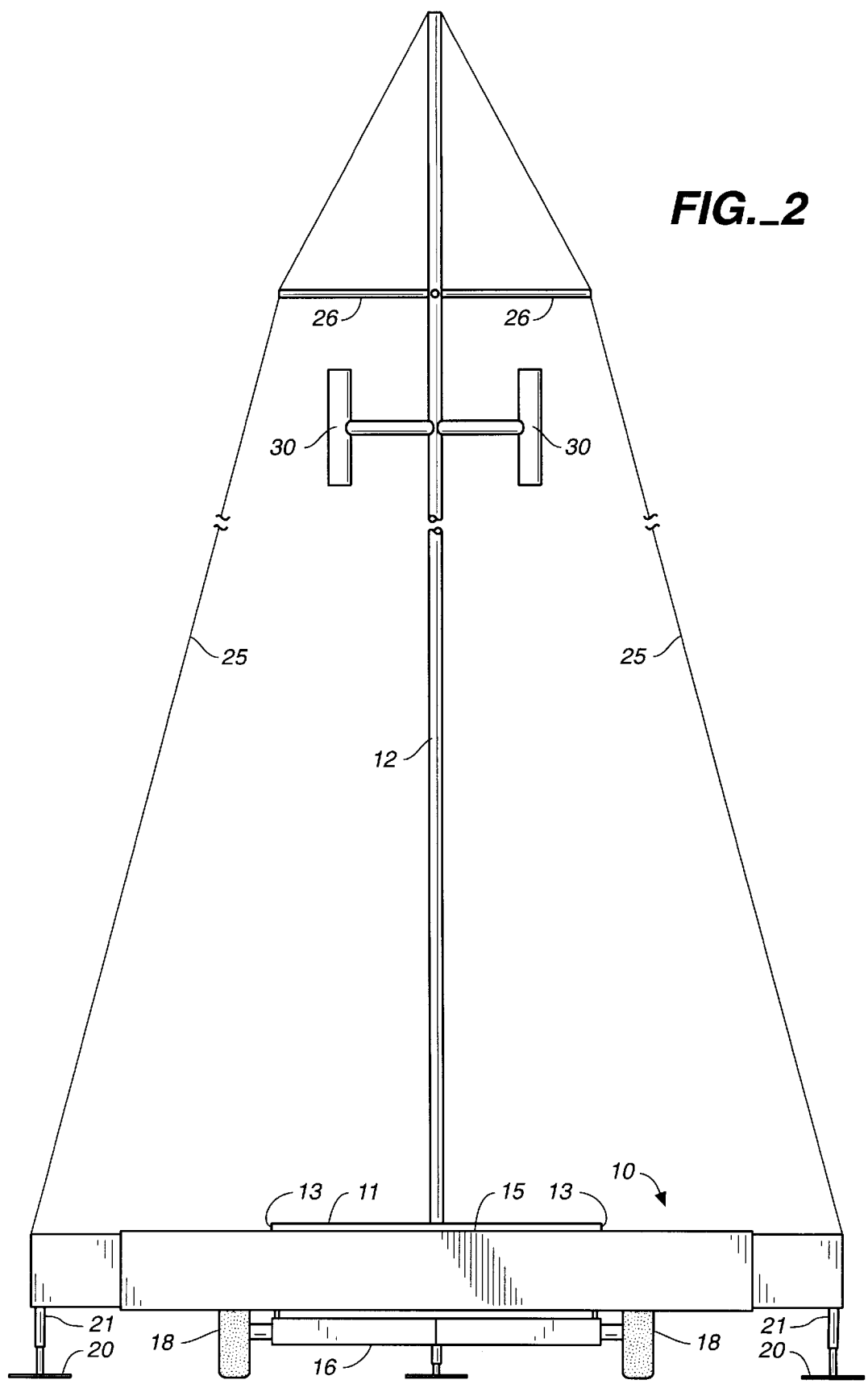
FIG._2

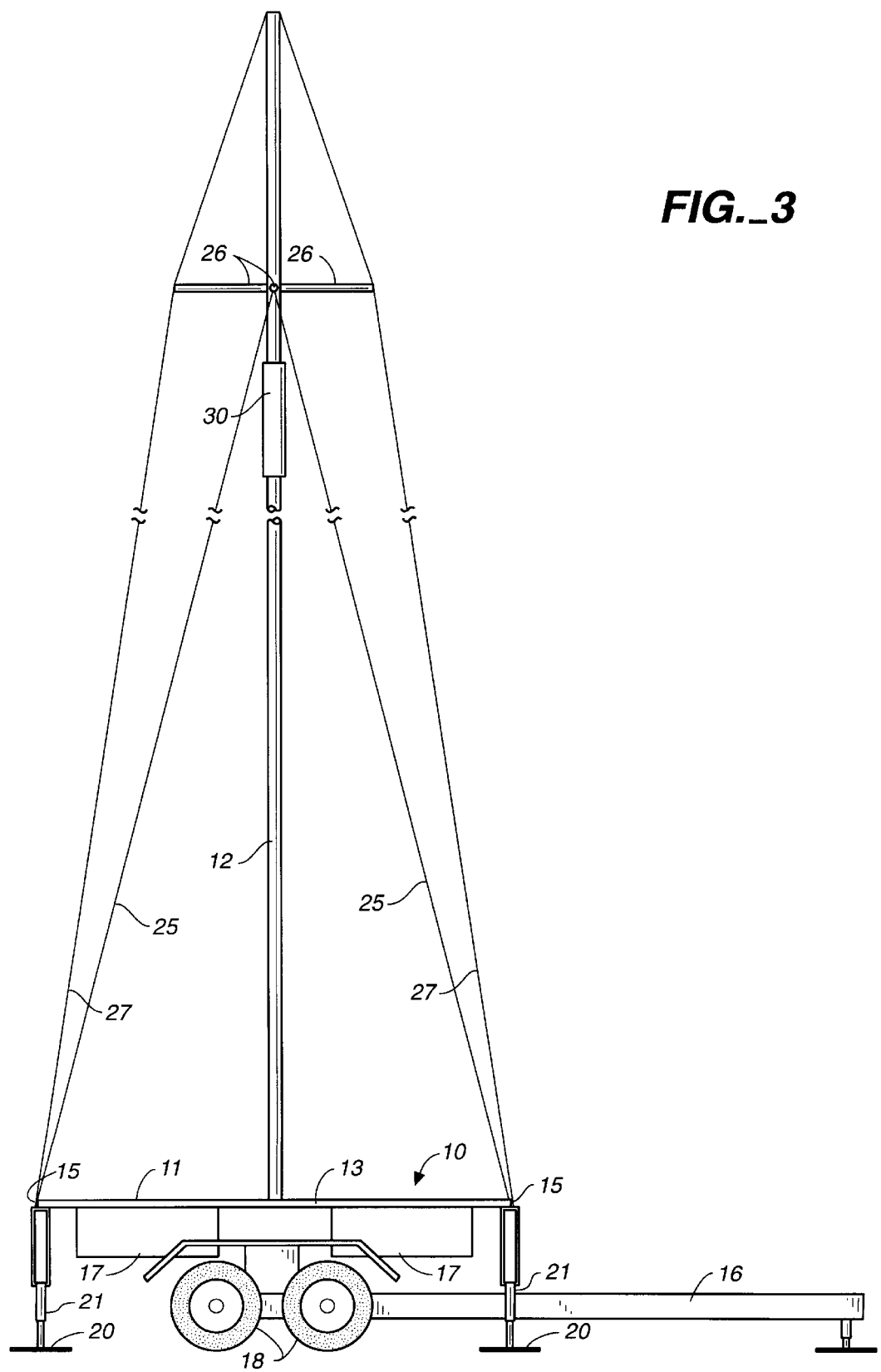
FIG._3

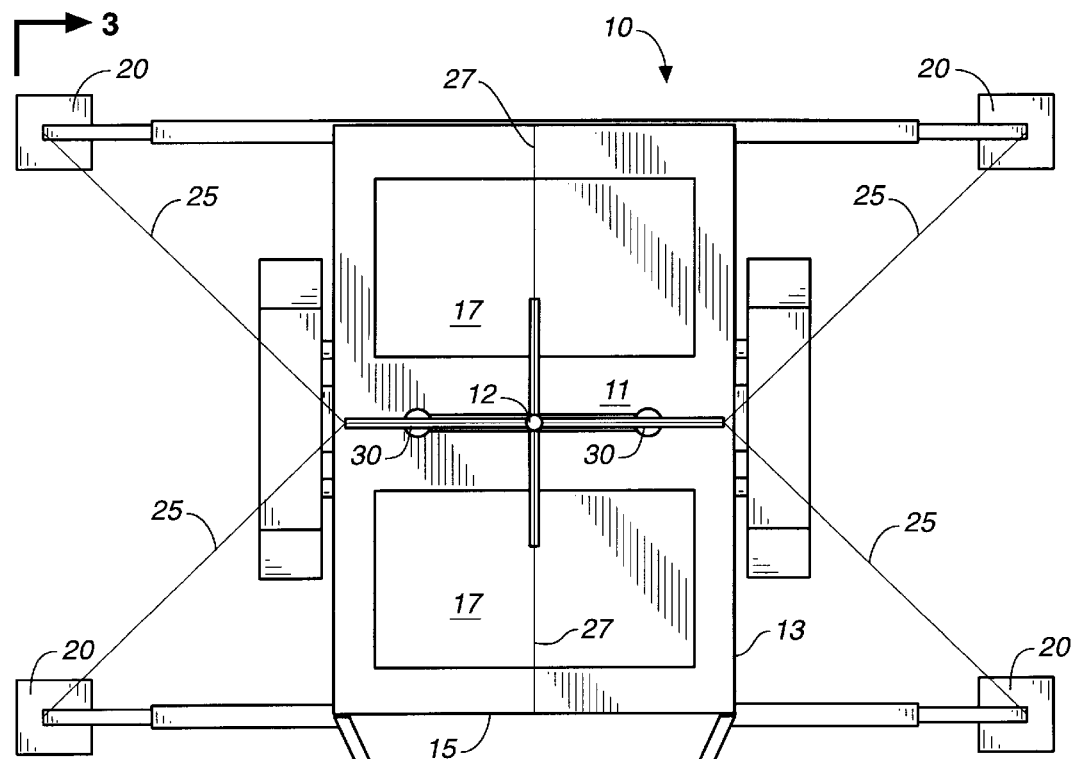
FIG._4

STABILIZED MOBILE RELAY STATION

TECHNICAL FIELD

This invention is in the field of mobile relay stations for use with cellular telephone or microwave communication systems.

BACKGROUND ART

Cellular telephone and microwave communication systems require relay stations to carry their signals beyond the range of a main transmitter. Each relay station includes a receiver to collect a signal, an amplifier to raise the power of the collected signal, a transmitter to send the amplified signal to its destination or to other relay stations, and antennas to receive and transmit the signals. Antennas for relay stations are usually permanently mounted on buildings or other permanent structures, but it is frequently necessary to install temporary relay stations to accommodate cellular telephone communication to areas that are remote from cities—for example, to geologic exploration sites, or to provide microwave transmission from sporting events or other events that are not performed in studios. The temporary relay stations also require antennas and those antennas must be mounted on masts in order to be at an adequate height. Temporary, mobile relay stations have been provided by mounting them on trailers or truck beds so that they may be transported on roads. At the site where a mobile relay station is to be used, a mast is mounted to hold the required antennas while the mechanisms necessary to deal with the communications are usually maintained on the vehicle that carries the equipment to the site where it is to be used.

The distance between transmitting antennas and receiving antennas is so critical that movement of an antenna caused by swaying of the mast on which it is mounted due to wind can seriously interfere with the ability of the relay station to function. Stabilizing the position of a mast-held antenna has been dealt with by using guy wires and massive foundations, but guy wires must be anchored at least fifty feet from the mast so that a ground area of about 300 square feet is required to provide a stable mast. The ground area for anchoring such guy wires is difficult to find in crowded urban environments, and it makes temporary relay stations unsightly and somewhat dangerous for pedestrians, bicyclists, and others using the area. In addition, massive foundations for temporary relay stations or for anchoring guy wires are unsightly and are difficult to remove without leaving permanent scars.

DISCLOSURE OF THE INVENTION

This invention is a mobile relay station that eliminates or greatly mitigates the problems enumerated above. The mobile relay station of this invention includes the electronic equipment for receiving, amplifying and retransmitting signals. In the device of this invention the mast and antenna assembly is mounted on a mobile base that can be transported over ordinary roads to the site where it is to be used. The invention includes a mobile base that is dimensioned for road travel, the base being mountable on a trailer, a truck bed, or a platform that can be trucked to the site of the relay station. The base includes transverse sides, at least part of which are perpendicular to the direction of travel of the base when it moves on a road, and longitudinal sides, at least part of which are parallel to the intended direction of travel on a road. The invention includes a mast on which antennas are mounted. The mast is mountable on the base, and the mast and base are connected together with guys that support the mast. The mast and the guys fall within the footprint of the base whereby no external support for the mast is needed. The base may include ballast and it may include extendable outriggers or the like that are included within the footprint of the base during road travel. For example, an outrigger employed with the device of this invention may be mechanically, pneumatically, or hydraulically extended from the base at the site where the relay station is to be erected.

The mast that is mountable on the base may be in segments that can be assembled at the site of use, and in use the mast includes antennas that are capable of receiving and transmitting signals to other relay stations or to a main transmission or reception site. The antennas may be highly directional dish antenna or other antenna known to the art. The device of this invention includes spreaders located toward the top of the mast so that a guy connected from the base to the top of the mast is connected to the end of the spreader whereby the mast is held against swaying by the combined effect of the angle at which a guy is connected between the top of a mast and the spreader on one hand and between the spreader and the base on the other. The device of this invention may also include containers for temporary ballast, such as bins which may be filled with sand or gravel or other heavy particulate material, or tanks that may be filled with water at the site where the relay station is to be used, but which may be emptied to reduce the weight of the device before it moves over a road.

BRIEF DESCRIPTION OF THE DRAWINGS

FIG. 1 is an elevation perspective view of a device illustrating an embodiment of this invention.

FIG. 2 is a front elevation view of FIG. 1.

FIG. 3 is a side elevation view of FIG. 1.

FIG. 4 is a plan view of FIG. 1.

DETAILED DESCRIPTION OF THE INVENTION

The relay station of this invention includes a base which is generally designated as 10. The base includes a platform 11 on which a mast 12 is mounted. Suitable means for mounting the mast include a socket in the platform 11 which is not shown. The platform 11 has longitudinal sides 13 and transverse sides 15. The distance between the longitudinal sides is such that the base can travel on roads. The distance is usually about 8 feet. The base also includes transverse sides 15. The transverse sides are perpendicular to the direction of travel, and the distance between the transverse sides is limited only by the legal length of a truck or a trailer. One transverse side is provided with a tow bar 16; and the base is provided, in the illustrated embodiment, with wheels mounted beneath the longitudinal sides so that the device may be trailed behind a vehicle. The base may have one or more containers for ballast 17, such as bins for sand or gravel or tanks for water. Although the longitudinal sides and the transverse sides are illustrated in the drawings as being straight, one or more of the sides may be curved or otherwise shaped to accommodate road travel. The base 10 may be mounted on a trailer, it may be a truck bed, or it may be mounted on skids that can be carried on a trailer or a truck bed for transportation to the site where it is to be used. In the illustrated embodiment the base 10 is mounted on a trailer provided with wheels 18. Outriggers 20 that fall within the footprint of the base during road travel and are extendable at the site of use may also be provided. Jacks 21 that are operated mechanically, pneumatically, or hydraulically may be used with the outriggers 20 so that the wheels 18 may be lifted above grade at the site where the device is to be used, thereby increasing the stability of mast 12 by avoiding the ability of springs or shock absorbers to function at the site of use.

An important feature of this invention is that the relay station of which it is a part is within the footprint of the base. No guys extending beyond the footprint of the base are required to provide a stable mast on which to mount antennas. To accomplish this objective the guys for the mast are connected between an upper portion of the mast 12 and the sides of the base. In the illustrated embodiment the upper portion of the mast 12 is connected to guys 25 which in turn are connected to spreader 26 and then to longitudinal sides 13 or to an outrigger 20 extending from side 13, which, for the purpose of this invention, is part of the longitudinal side of the base. Guys 27 connect the upper portion of mast 12 to the transverse sides of base 10, and in the illustrated embodiment the tow bar 16 is a portion of the forward transverse side. In accordance with this invention, no portion of the site at which the device of this invention is erected will be significantly disturbed. Significant disturbances include permanent foundations for holding guys or for supporting the base on which the device of this invention is held. The only disturbance to the area where the device is erected will be tire tracks and leveling of the earth, which will leave no significant disturbances to the site after the temporary relay station is removed. It is, of course, necessary for the device of this invention to be used in conjunction with electronic equipment, but the electronic equipment needed for a portable relay station does not require the stability of a mast, and it accordingly does not involve construction. Mostly it can be transported to and from the site of use on road vehicles and in most cases supported on the same base on which the mast and antenna assembly is supported and carried. The mast employed with the device of this invention may be segmented so that it can be transported to the site of use in relatively short segments—for example, 10–12 feet in length, and those segments can be connected together and assembled at the site of use to provide an antenna of any reasonable height.

Antennas 30 are mounted toward the tip of mast 12. There may be any number of antennas 30 mounted on mast 12, and they may be specially adapted for receiving signals or transmitting signals or both. The illustrated embodiment shows generic antennas. The type, number and shape of antennas 30 will be selected to perform their functions.

What is claimed is:

1. A mobile relay station for receiving and transmitting microwave signals comprising a mobile base dimensioned for road travel, said base having transverse sides and longitudinal sides;

a mast mounted on said base;

first guy means connected between the upper portion of said mast and said transverse sides:

second guy means connected between the upper portion of said mast and said longitudinal sides;

a spreader between said mast and said second guy means; and antenna means mounted on said mast, whereby said mast is restrained against wind-induced swaying and said antenna means is maintained at a fixed distance from receiving and transmitting relay antennas.

2. The device of claim 1 wherein said mobile base includes ballast.

3. The device of claim 1 wherein said base includes outriggers extendable from said longitudinal sides.

4. The device of claim 1 wherein said base includes an outrigger extendable from a transverse side.

\* \* \* \* \*